United States Patent [19]

Murphy, Jr. et al.

[11] 4,068,274
[45] Jan. 10, 1978

[54] MAGNETIC SWITCH AND CIRCUITRY FOR SAFETY SHUT DOWN OF POWER EQUIPMENT

[75] Inventors: Frank W. Murphy, Jr., Bixby; Buddy G. Sparks, Tulsa, both of Okla.

[73] Assignee: Frank W. Murphy Manufacturer, Inc., Tulsa, Okla.

[21] Appl. No.: 731,648

[22] Filed: Oct. 13, 1976

[51] Int. Cl.² .............................................. H02H 3/04
[52] U.S. Cl. .................................... 361/23; 307/10 R; 361/189
[58] Field of Search ............................ 361/1, 23, 189; 307/10 R; 340/52 F

[56] References Cited

U.S. PATENT DOCUMENTS

| 3,746,926 | 7/1973 | Sparks | 361/23 |
| 3,764,974 | 10/1973 | Melian | 307/10 R X |

*Primary Examiner*—Harry E. Moose, Jr.
*Attorney, Agent, or Firm*—D. Paul Weaver

[57] ABSTRACT

An electromagnetic normally energized fault sensing and shut down switch is employed in a unique mode of operation with essential operating components of power equipment, such as engines, and in conjunction with normally open and normally closed safety switches. Costly power equipment is protected following failure or malfunction of any one operational accessory component and a fail-safe equipment monitoring and shut down system is provided.

5 Claims, 3 Drawing Figures

4,068,274

MAGNETIC SWITCH AND CIRCUITRY FOR SAFETY SHUT DOWN OF POWER EQUIPMENT

BACKGROUND OF THE INVENTION

Safety monitoring and shut down means for internal combustion engines, compressors and other stationary power equipment of great cost is essential. The prior art has proposed a variety of systems and devices to deal with the problem and one example of the patented prior art is U.S. Pat. No. 3,746,926. This patent discloses a normally continuously energized magnetic control switch and visual indicator element for use as part of a safety indicating and shut down system for engines and the like, and responsive to malfunction or failure of such operational components as fuel supply means, air shut off solenoid, ignition means, lubrication supply and the like.

The main objective of the present invention is to improve on the efficiency and reliability of the prior art control, monitoring and automatic shut down means for engines and other power equipment by utilization of basically the same magnetic switch disclosed in the aforementioned patent in conjunction with a novel arrangement of safety switches which assures a fault-sensitive and fail-safe system of operation and overall increased reliability of the system. In comparable prior art arrangements, it frequently happens that, because of heavy vibration induced by the power equipment, a wire or wires connected with the safety switch may loosen or become disconnected thereby rendering the costly equipment unprotected when a malfunction of some vital control or operational component occurs. The present invention completely overcomes this difficulty by providing a fault-sensitive control circuit which will sense such wiring separations or other circuitry faults in addition to visually indicating a malfunction of any one equipment operational component and responding automatically to such malfunction by shutting down the equipment.

Other features and advantages of the invention will become apparent during the course of the following detailed description.

DETAILED DESCRIPTION

Figure 3:
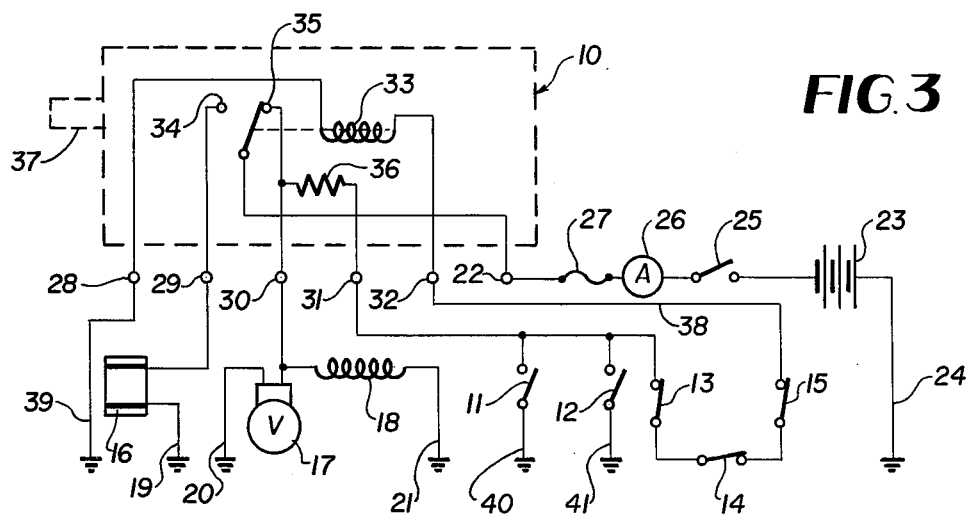
FIG. 3 is a similar view of an improved fault-sensitive circuit with normally open safety switches and normally closed switches and embodying the improvement constituting the invention.

Referring to the drawings in general and more particularly referring to FIG. 3, an electromagnetic switch 10 constructed substantially in accordance with the disclosure of the above-referenced U.S. Pat. No. 3,746,926 is utilized in an improved fault-sensitive control circuit, in conjunction with a pair of normally open one wire to ground safety switches 11 and 12 and a group, such as three, serially connected normally closed switches 13, 14 and 15.

The improved circuit for monitoring the operation of power equipment, such as an engine, and for shutting down the engine responsive to a serious malfunction also includes operational components or accessories for the engine essential to its operation. Such components include a normally de-energized air shut-off solenoid 16 which must be energized for shutting down, a fuel valve 17 which is de-energized to shut down, and an ignition coil 18 which is de-energized to shut down. The components 16, 17 and 18 are grounded through wires 19, 20 and 21. The magnetic switch 10 receives power through a power terminal 22 from a system storage battery 23 having a grounding conductor 24. The engine ignition switch 25, a suitable ammeter 26, and power line fuse 27 are serially connected between the battery 23 and power terminal 22 of the switch 10. As disclosed in the referenced patent, the magnetic switch 10 further embodies a grounding terminal 28, normally open and normally closed terminals 29 and 30, and switch terminals 31 and 32. The electromagnetic coil 33 of the switch 10 is illustrated in FIG. 3, together with normally open and normally closed switch contacts 34 and 35 which are respectively connected to the terminals 29 and 30. A resistor 36 is electrically coupled between switch contact 31 and normally closed contact 35 and terminal 30, as indicated. The visual indicator plunger 37 of the magnetic switch 10, which is normally retracted into the switch housing when the coil 33 is energized in accordance with the referenced patent, is also shown in FIG. 3.

In the operation of the fault-sensitive equipment shut down circuit of FIG. 3, power is applied to power terminal 22 of the switch 10 from the system battery 23 and is transmitted through the set of normally closed contacts 35 to the NC terminal 30 from which the ignition coil 18 of the engine is powered.

Power is also transmitted to the latching mechanism of the switch 10, not shown, and through the resistor 36 to switch terminal 31 and from this terminal to each of the individual one wire to ground normally open safety switches 11 and 12 and to the series of normally closed switches (alignment switches, etc.) 13, 14 and 15.

After this loop is completed, power is delivered through a conductor 38 to switch terminal 32 and through the coil 33 and grounding terminal 28 to an externally established ground 39. This maintains the magnetic switch 10 continually energized as long as the normally closed safety switches 13, 14 and 15, or normally open safety switches 11 and 12 do not sense an adverse condition. Should such an adverse condition be reached on the normally open switches 11 or 12, a circuit is completed to ground at 40 or 41 which will "shunt" trip the magnetic switch 10 through the resistor 36, thus de-energizing the magnetic switch. This removes power from the NC terminal 30 of the switch, thereby shutting down the engine or other power equipment. By the same token, should any of the normally closed switches 13, 14 or 15 open, the power from battery 23 to the switch coil 33 is removed and the magnetic switch trips or de-energizes.

In essence, the invention as described in FIG. 3 provides a unique device which will operate in conjunction with either normally open or normally closed safety switches to accomplish shut down of an internal combustion engine or the like. The device is normally energized through the coil 33 and is de-energized to trip. The device can be employed with either normally open or normally closed shut down actuating means. Since it is continually energized when in the "run" position, it is less susceptible to nuisance tripping occasioned by shock or vibrations. The device is fault-sensitive and will detect a broken circuit to the normally open one wire to ground switches 11 or 12, or corroded wiring, and thereby prevent safety systems from becoming inoperative. The advantages of the device over the prior art should be apparent to those skilled in the art.

Figure 1:
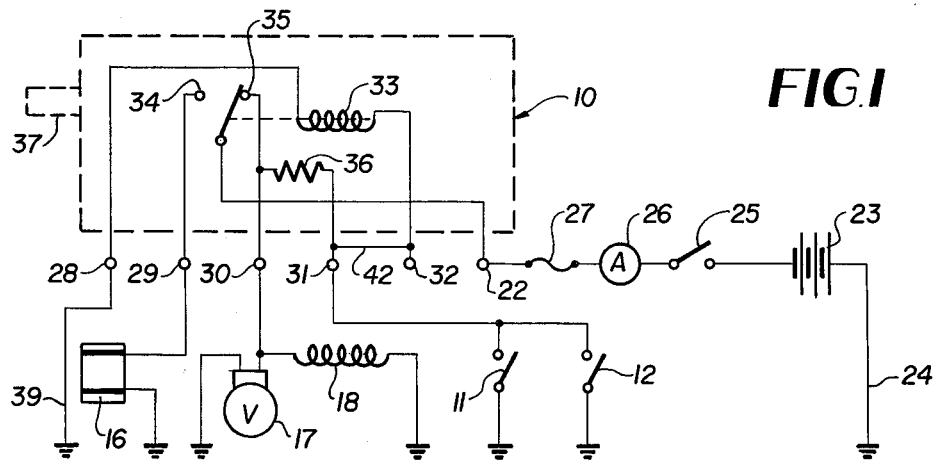
FIG. 1 is a schematic view of a non-fault-sensitive circuit employed in power equipment malfunction monitoring and safety shut down of such equipment.

FIG. 1 shows control circuitry essentially in accordance with the teachings of the prior art as disclosed in U.S. Pat. No. 3,746,926. The FIG. 1 circuit is not fault-sensitive and the normally closed switches 13 through 15 of the improved circuit in FIG. 3 are absent. A jumper wire 42 is connected between the switch terminals 31 and 32. Otherwise, the construction of the circuit in FIG. 1 corresponds to FIG. 3.

Figure 2:
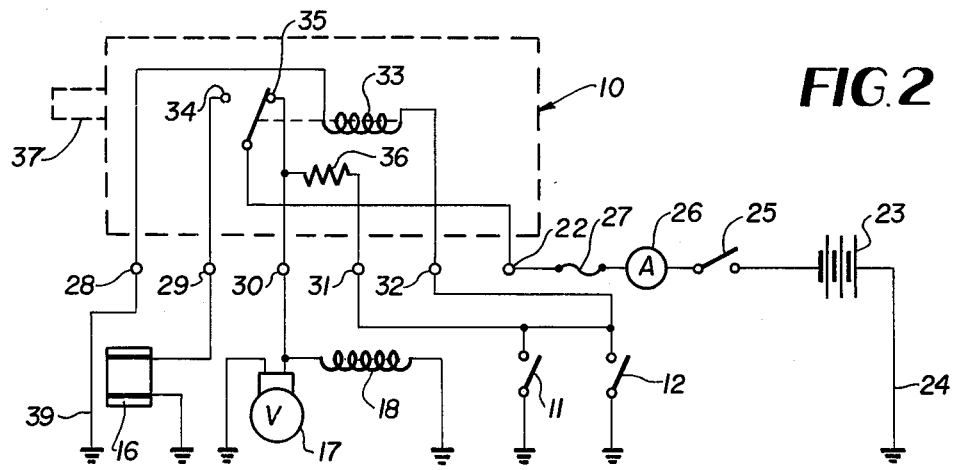
FIG. 2 is a similar schematic view of a fault-sensitive circuit.

FIG. 2 discloses a circuit embodiment identical to FIG. 1 except that the jumper 42 is omitted and the circuit is fault-sensitive but without the inclusion of the normally closed switches 13 through 15 in FIG. 3.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. In a fault-sensitive safety monitoring and shut down system for power equipment having electrically controlled operating components whose individual functions are essential to safe operation of said equipment, an electromagnetic switch having a coil and having normally closed and normally open contacts, a power terminal for the switch which is electrically coupled with said normally closed contact, an external grounding terminal which is electrically coupled with said coil, a first switch terminal, a resistance element coupled between the first switch terminal and said normally closed contact, a second switch terminal electrically coupled with said coil, and additional switch terminals electrically coupled with said operating components, said last-named switch terminals coupled one each with said normally closed and normally open contacts, the improvement comprising a plurality of normally open and grounded safety switches electrically coupled with said first switch terminal, and a second plurality of normally closed switches coupled between said first and second switch terminals, said first-named plurality and second plurality of switches being electrical fault-sensing switches.

2. In a safety monitoring and automatic shut down system for power equipment according to claim 1, and said second plurality of normally closed switches being serially connected between said first and second switch terminals and being connected in parallel with the individual grounded normally open safety switches of the first-named plurality.

3. In a fault-sensitive safety monitoring and shut down system for power equipment according to claim 1, and a grounded power source for the system electrically coupled with said power terminal of said switch.

4. In a fault-sensitive safety monitoring and shut down system for power equipment according to claim 3, and wherein said power equipment is an internal combustion engine having an ignition system and one of said operating components is a grounded ignition coil which is electrically coupled with said normally closed contact, and an ignition switch electrically coupled between said power terminal and said grounded power source.

5. In a fault-sensitive safety monitoring and shut down system for power equiment according to claim 4, and another of said operating components comprising a grounded solenoid operator which is electrically coupled to said normally open switch contact.

* * * * *